US012597249B1

(12) United States Patent
Kamath et al.

(10) Patent No.: US 12,597,249 B1
(45) Date of Patent: Apr. 7, 2026

(54) LIVING AREA ESTIMATION USING AERIAL IMAGERY

(71) Applicant: CoreLogic Solutions, LLC, Irvine, CA (US)

(72) Inventors: Prashanth Mohan Kamath, Mequon, WI (US); Andrew Duc Thanh Nguyen, Irvine, CA (US); Anand Singh, Tustin, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 737 days.

(21) Appl. No.: 17/975,420

(22) Filed: Oct. 27, 2022

Related U.S. Application Data

(60) Provisional application No. 63/399,898, filed on Aug. 22, 2022, provisional application No. 63/273,758, filed on Oct. 29, 2021.

(51) Int. Cl.
　*G06V 10/762*　(2022.01)
　*G06V 10/774*　(2022.01)
　*G06V 20/10*　(2022.01)

(52) U.S. Cl.
　CPC .......... *G06V 20/176* (2022.01); *G06V 10/762* (2022.01); *G06V 10/774* (2022.01)

(58) Field of Classification Search
　CPC .... G06V 20/176; G06V 10/774; G06V 20/13; G06V 20/17; G06V 10/70; G06V 10/82; G06T 2207/30181; G06T 2207/30184; G06T 2207/20081; G06T 2207/10032; G06T 2207/20084; G06N 3/047; G06N 20/00
　See application file for complete search history.

(56) References Cited

U.S. PATENT DOCUMENTS

| | | | |
|---|---|---|---|
| 10,255,550 B1 * | 4/2019 | Simkoff | G06N 3/08 |
| 10,648,800 B2 | 5/2020 | Thornberry et al. | |
| 11,783,385 B1 * | 10/2023 | Khosravan | G06T 7/73 |
| | | | 382/103 |
| 2013/0155109 A1 * | 6/2013 | Schultz | G06T 11/003 |
| | | | 345/634 |
| 2013/0262029 A1 | 10/2013 | Pershing | |
| 2020/0111113 A1 | 4/2020 | Pershing et al. | |
| 2020/0226474 A1 * | 7/2020 | Fidler | G06V 10/454 |
| 2021/0117583 A1 * | 4/2021 | Strong | G06T 7/10 |

* cited by examiner

*Primary Examiner* — Gandhi Thirugnanam
*Assistant Examiner* — Michael Adam Shariff
(74) *Attorney, Agent, or Firm* — Knobbe Martens Olson & Bear LLP

(57) ABSTRACT

An improved living area estimation system is described herein that can obtain aerial images of structures and property data corresponding to structures. The improved living area estimation system can then perform image processing on the aerial images to estimate a living area of each structure. The improved living area estimation system can group property records for the various structures based on one or more criterion and, for each group of property records, determine the average difference between living area calculated using aerial images and living area included in the property data. For a particular structure, the improved living area estimation system can process the aerial image(s) to estimate living area and then modify this value by the average difference determined for the group to which the structure belongs to determine an estimated living area of the structure.

20 Claims, 4 Drawing Sheets

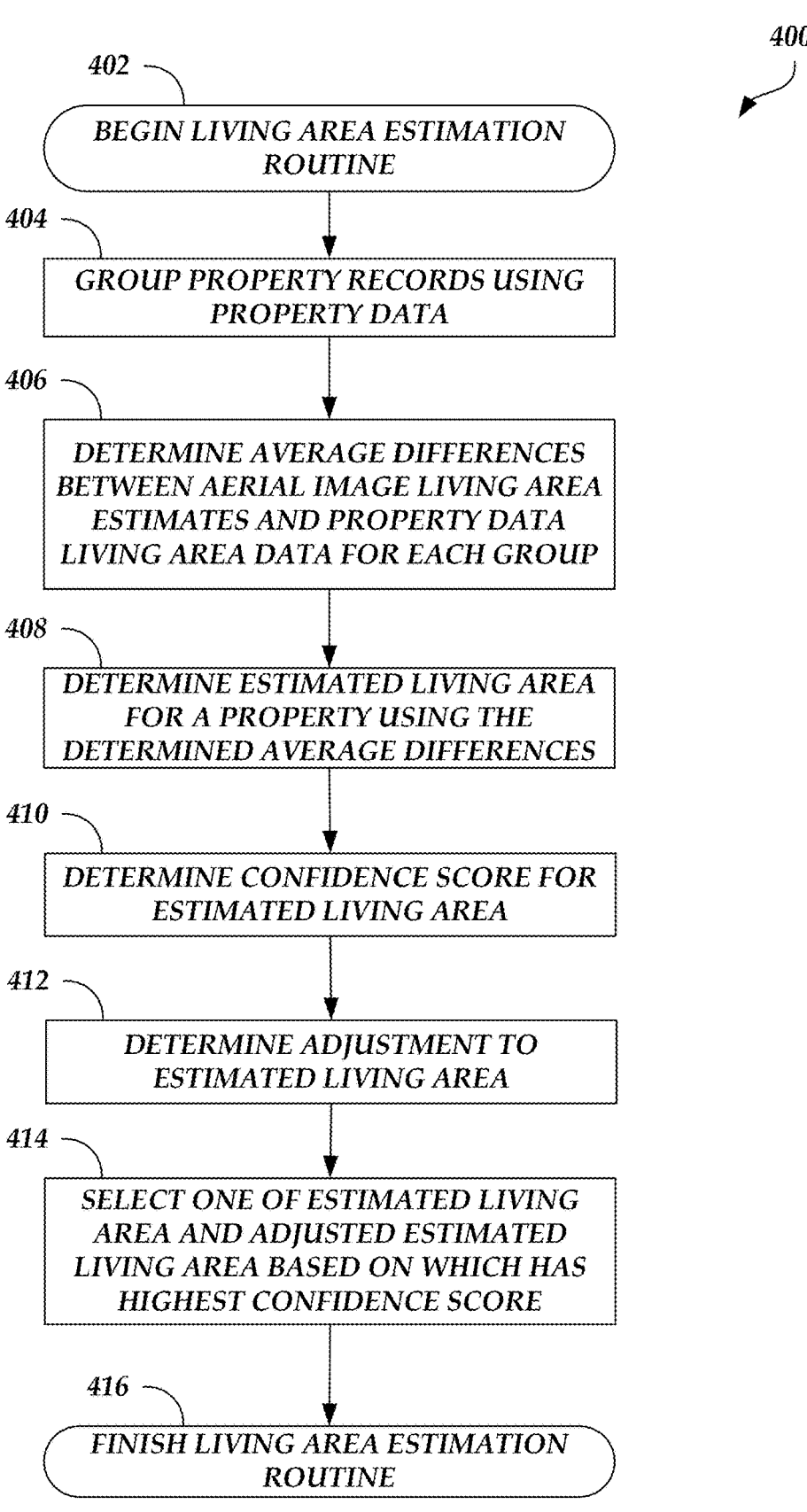

*400*

402 — BEGIN LIVING AREA ESTIMATION ROUTINE

404 — GROUP PROPERTY RECORDS USING PROPERTY DATA

406 — DETERMINE AVERAGE DIFFERENCES BETWEEN AERIAL IMAGE LIVING AREA ESTIMATES AND PROPERTY DATA LIVING AREA DATA FOR EACH GROUP

408 — DETERMINE ESTIMATED LIVING AREA FOR A PROPERTY USING THE DETERMINED AVERAGE DIFFERENCES

410 — DETERMINE CONFIDENCE SCORE FOR ESTIMATED LIVING AREA

412 — DETERMINE ADJUSTMENT TO ESTIMATED LIVING AREA

414 — SELECT ONE OF ESTIMATED LIVING AREA AND ADJUSTED ESTIMATED LIVING AREA BASED ON WHICH HAS HIGHEST CONFIDENCE SCORE

416 — FINISH LIVING AREA ESTIMATION ROUTINE

*Fig. 4*

LIVING AREA ESTIMATION USING AERIAL IMAGERY

CROSS-REFERENCE TO RELATED APPLICATIONS

This application claims priority under 35 U.S.C. § 119(e) to U.S. Provisional Application No. 63/273,758, entitled "AREA UNDER ROOF ESTIMATION USING AERIAL IMAGERY" and filed on Oct. 29, 2021, and to U.S. Provisional Application No. 63/399,898, entitled "LIVING AREA ESTIMATION USING AERIAL IMAGERY" and filed on Aug. 22, 2022, which are hereby incorporated by reference herein in their entireties.

TECHNICAL FIELD

The present disclosure generally relates to estimating a living area of a building using aerial imagery, image processing, and/or property characteristics.

BACKGROUND

An important feature of structures is the living area. For example, the living area may be an interior habitable area of a dwelling unit and can include one or more bedrooms, one or more closets, one or more bathrooms, one or more stories, a family room, a living room, a kitchen, and/or the like. Obtaining an accurate calculation or estimation of the living area can help a potential homeowner understand whether existing furniture will fit within a particular room, the type of heating and/or air conditioning units that may be necessary to heat and/or cool the interior of the property, portions and/or the amount of the property that may be exposed to hazards (e.g., hail events, wind events, floods, storm surge, lightning strikes, tornadoes, hurricanes, other weather phenomena, earthquakes, wildfires, service life of structures, etc.), and/or the like.

SUMMARY

The systems, methods, and devices described herein each have several aspects; no single one of which is solely responsible for its desirable attributes. Without limiting the scope of this disclosure, several non-limiting features will now be discussed briefly.

One aspect of the disclosure provides a system for estimating a living area of a structure. The system comprises memory that stores computer-executable instructions. The system further comprises a processor in communication with the memory, where the computer-executable instructions, when executed by the processor, cause the processor to: obtain a request for the living area of the structure from a user device; process one or more aerial images corresponding to the structure; estimate a first living area of the structure based on the processing of the one or more aerial images; modify the first living area of the structure by a ratio difference corresponding to a property group to which the structure belongs; determine a confidence score of the modified first living area; determine that the confidence score of the modified first living area is less than a threshold score; determine an adjustment metric for the structure based on property data corresponding to the structure; adjust the modified first living area using the adjustment metric to form a second living area; determine a second confidence score of the second living area; and transmit, to the user device, either the modified first living area or the second living area based on the confidence score and the second confidence score.

The system of the preceding paragraph can include any sub-combination of the following features: where the computer-execution instructions, when executed, further cause the processor to: group one or more property records of the property data based on characteristics of the one or more property records; and for each property record group, determine an average ratio difference between a living area estimated using aerial imagery and a living area included in the property data for each property record in the respective property record group.

Another aspect of the disclosure provides a system for estimating a living area of a structure. The system comprises memory that stores computer-executable instructions. The system further comprises a processor in communication with the memory, where the computer-executable instructions, when executed by the processor, cause the processor to: determine an accuracy of property data originating from one or more data sources using a trained machine learning model; obtain the property data from a first data source in the one or more data sources having a highest determined accuracy; obtain a request for the living area of the structure from a user device; process one or more aerial images corresponding to the structure; estimate a first living area of the structure based on the processing of the one or more aerial images; determine a property group to which the structure belongs based on the obtained property data; modify the first living area of the structure by a ratio difference corresponding to the property group to which the structure belongs; determine a confidence score of the modified first living area; determine that the confidence score of the modified first living area is less than a threshold score; determine an adjustment metric for the structure based on a portion of the property data corresponding to the structure; adjust the modified first living area using the adjustment metric to form a second living area; determine a second confidence score of the second living area; and transmit, to the user device, either the modified first living area or the second living area based on the confidence score and the second confidence score.

The system of the preceding paragraph can include any sub-combination of the following features: where the computer-execution instructions, when executed, further cause the processor to: group one or more property records of the property data based on characteristics of the one or more property records, and for each property record group, determine an average ratio difference between a living area estimated using aerial imagery and a living area included in the property data for each property record in the respective property record group; where the computer-execution instructions, when executed, further cause the processor to: train a machine learning model using training data to form the trained machine learning model, where the training data comprises, for one or more second data sources, how recent the respective second data source was updated, whether the respective second data source provides property data values that match property data values provided by other second data sources, a value representing how similar properties for which property data is provided by the respective second data source are to properties in surrounding neighborhoods, or a value representing the similarity of property types and styles of properties for which property data is provided by the respective second data source, and where each item in the training data is labeled with data indicating an accuracy of the respective second data source, and apply, as an input to the trained machine learning model, at least one of how recent the first data source was updated, whether the first data source provides property data values that match property data values provided by other data sources in the one or more data sources, a value representing how similar properties for which property data is provided by the first data source are to properties in surrounding neighborhoods, or a value representing the similarity of property types and styles of properties for which property data is provided by the first data source to determine an accuracy of the first data source; where the computer-execution instructions, when executed, further cause the processor to: predict a data value for one type of property data originating from the first data source using a second trained machine learning model, and modify the property data to include the predicted data value; where each of the one or more aerial images is annotated to include a polygon defined by a set of geographic coordinates that fall within a location at which the respective aerial image is captured; where a first aerial image in the one or more aerial images is annotated to include a first polygon that partially overlaps at least two structures including the structure; where the computer-execution instructions, when executed, further cause the processor to: train a second machine learning model to predict to which structure a polygon is intended to surround, apply the first aerial image annotated with the first polygon as an input to the trained second machine learning model, and determine that the first polygon is intended to surround the structure based on an output of the trained second machine learning model; where the computer-execution instructions, when executed, further cause the processor to: determine that a centroid of the first polygon is closer to the structure, and determine that the first polygon is intended to surround the structure; where the computer-execution instructions, when executed, further cause the processor to perform a pixel analysis of the one or more aerial images to identify pixels of the one or more aerial images that are edges that represent an exterior boundary of the structure; and where the adjustment metric corresponds to one of a garage, terrace, carport, or balcony of the structure.

Another aspect of the disclosure provides a computer-implemented method for estimating a living area of a structure. The computer-implemented method further comprises: determining an accuracy of property data originating from one or more data sources using a trained machine learning model; obtaining the property data from a first data source in the one or more data sources having a highest determined accuracy; obtaining a request for the living area of the structure from a user device; processing one or more aerial images corresponding to the structure; estimating a first living area of the structure based on the processing of the one or more aerial images; determining a property group to which the structure belongs based on the obtained property data; modifying the first living area of the structure by a ratio difference corresponding to the property group to which the structure belongs; determining a confidence score of the modified first living area; determining that the confidence score of the modified first living area is less than a threshold score; determining an adjustment metric for the structure based on a portion of the property data corresponding to the structure; adjusting the modified first living area using the adjustment metric to form a second living area; determining a second confidence score of the second living area; and transmitting, to the user device, either the modified first living area or the second living area based on the confidence score and the second confidence score.

The computer-implemented method of the preceding paragraph can include any sub-combination of the following features: where the computer-implemented method further comprises: grouping one or more property records of the property data based on characteristics of the one or more property records, and for each property record group, determining an average ratio difference between a living area estimated using aerial imagery and a living area included in the property data for each property record in the respective property record group; where the computer-implemented method further comprises: training a machine learning model using training data to form the trained machine learning model, where the training data comprises, for one or more second data sources, how recent the respective second data source was updated, whether the respective second data source provides property data values that match property data values provided by other second data sources, a value representing how similar properties for which property data is provided by the respective second data source are to properties in surrounding neighborhoods, or a value representing the similarity of property types and styles of properties for which property data is provided by the respective second data source, and where each item in the training data is labeled with data indicating an accuracy of the respective second data source, and applying, as an input to the trained machine learning model, at least one of how recent the first data source was updated, whether the first data source provides property data values that match property data values provided by other data sources in the one or more data sources, a value representing how similar properties for which property data is provided by the first data source are to properties in surrounding neighborhoods, or a value representing the similarity of property types and styles of properties for which property data is provided by the first data source to determine an accuracy of the first data source; where the computer-implemented method further comprises: predicting a data value for one type of property data originating from the first data source using a second trained machine learning model, and modifying the property data to include the predicted data value; where each of the one or more aerial images is annotated to include a polygon defined by a set of geographic coordinates that fall within a location at which the respective aerial image is captured; where a first aerial image in the one or more aerial images is annotated to include a first polygon that partially overlaps at least two structures including the structure; and where the computer-implemented method further comprises: training a second machine learning model to predict to which structure a polygon is intended to surround, applying the first aerial image annotated with the first polygon as an input to the trained second machine learning model, and determining that the first polygon is intended to surround the structure based on an output of the trained second machine learning model.

Another aspect of the disclosure provides a non-transitory, computer-readable medium comprising computer-executable instructions for estimating a living area of a structure, where the computer-executable instructions, when executed by a computer system, cause the computer system to: determine an accuracy of property data originating from one or more data sources using a trained machine learning model; obtain the property data from a first data source in the one or more data sources having a highest determined accuracy; obtain a request for the living area of the structure from a user device; process one or more aerial images corresponding to the structure; estimate a first living area of the structure based on the processing of the one or more aerial images; determine a property group to which the structure belongs based on the obtained property data; modify the first living area of the structure by a ratio difference corresponding to the property group to which the structure belongs; determine a confidence score of the modified first living area; determine that the confidence score of the modified first living area is less than a threshold score; determine an adjustment metric for the structure based on a portion of the property data corresponding to the structure; adjust the modified first living area using the adjustment metric to form a second living area; determine a second confidence score of the second living area; and transmit, to the user device, either the modified first living area or the second living area based on the confidence score and the second confidence score.

The non-transitory, computer-readable medium of the preceding paragraph can include any sub-combination of the following features: where each of the one or more aerial images is annotated to include a polygon defined by a set of geographic coordinates that fall within a location at which the respective aerial image is captured, and where a first aerial image in the one or more aerial images is annotated to include a first polygon that partially overlaps at least two structures including the structure; and where the computer-execution instructions, when executed, further cause the computer system to: train a second machine learning model to predict to which structure a polygon is intended to surround, apply the first aerial image annotated with the first polygon as an input to the trained second machine learning model, and determine that the first polygon is intended to surround the structure based on an output of the trained second machine learning model.

Another aspect of the disclosure provides a system for estimating a living area of a structure. The system comprises memory that stores computer-executable instructions. The system further comprises a processor in communication with the memory, where the computer-executable instructions, when executed by the processor, cause the processor to: determine an accuracy of property data originating from one or more data sources using a trained machine learning model; obtain the property data from a first data source in the one or more data sources having a highest determined accuracy; obtain a request for the living area of the structure; process one or more aerial images corresponding to the structure; and estimate a first living area of the structure based on the processing of the one or more aerial images.

The system of the preceding paragraph can include any sub-combination of the following features: where the computer-execution instructions, when executed, further cause the processor to: determine a property group to which the structure belongs based on the obtained property data, modify the first living area of the structure by a ratio difference corresponding to the property group to which the structure belongs, determine a confidence score of the modified first living area, determine that the confidence score of the modified first living area is less than a threshold score, determine an adjustment metric for the structure based on a portion of the property data corresponding to the structure, adjust the modified first living area using the adjustment metric to form a second living area, determine a second confidence score of the second living area, and transmit, to a user device, either the modified first living area or the second living area based on the confidence score and the second confidence score; where the adjustment metric corresponds to one of a garage, terrace, carport, or balcony of the structure; where the computer-execution instructions, when executed, further cause the processor to: group one or more property records of the property data based on characteristics of the one or more property records, and for each property record group, determine an average ratio difference between a living area estimated using aerial imagery and a living area included in the property data for each property record in the respective property record group; where the computer-execution instructions, when executed, further cause the processor to: train a machine learning model using training data to form the trained machine learning model, where the training data comprises, for one or more second data sources, how recent the respective second data source was updated, whether the respective second data source provides property data values that match property data values provided by other second data sources, a value representing how similar properties for which property data is provided by the respective second data source are to properties in surrounding neighborhoods, or a value representing the similarity of property types and styles of properties for which property data is provided by the respective second data source, and where each item in the training data is labeled with data indicating an accuracy of the respective second data source, and apply, as an input to the trained machine learning model, at least one of how recent the first data source was updated, whether the first data source provides property data values that match property data values provided by other data sources in the one or more data sources, a value representing how similar properties for which property data is provided by the first data source are to properties in surrounding neighborhoods, or a value representing the similarity of property types and styles of properties for which property data is provided by the first data source to determine an accuracy of the first data source; where the computer-execution instructions, when executed, further cause the processor to: predict a data value for one type of property data originating from the first data source using a second trained machine learning model, and modify the property data to include the predicted data value; where each of the one or more aerial images is annotated to include a polygon defined by a set of geographic coordinates that fall within a location at which the respective aerial image is captured; where a first aerial image in the one or more aerial images is annotated to include a first polygon that partially overlaps at least two structures including the structure; where the computer-execution instructions, when executed, further cause the processor to: train a second machine learning model to predict to which structure a polygon is intended to surround, apply the first aerial image annotated with the first polygon as an input to the trained second machine learning model, and determine that the first polygon is intended to surround the structure based on an output of the trained second machine learning model; where the computer-execution instructions, when executed, further cause the processor to: determine that a centroid of the first polygon is closer to the structure, and determine that the first polygon is intended to surround the structure; and where the computer-execution instructions, when executed, further cause the processor to perform a pixel analysis of the one or more aerial images to identify pixels of the one or more aerial images that are edges that represent an exterior boundary of the structure.

Another aspect of the disclosure provides a computer-implemented method for estimating a living area of a structure. The computer-implemented method further comprises: determining an accuracy of property data originating from one or more data sources using a trained machine learning model; obtaining the property data from a first data source in the one or more data sources having a highest determined accuracy; obtaining a request for the living area of the structure; processing one or more aerial images corresponding to the structure; and estimating a first living area of the structure based on the processing of the one or more aerial images.

The computer-implemented method of the preceding paragraph can include any sub-combination of the following features: where the computer-implemented method further comprises: determining a property group to which the structure belongs based on the obtained property data; modifying the first living area of the structure by a ratio difference corresponding to the property group to which the structure belongs, determining a confidence score of the modified first living area, determining that the confidence score of the modified first living area is less than a threshold score, determining an adjustment metric for the structure based on a portion of the property data corresponding to the structure, adjusting the modified first living area using the adjustment metric to form a second living area, determining a second confidence score of the second living area, and transmitting, to a user device, either the modified first living area or the second living area based on the confidence score and the second confidence score; where the computer-implemented method further comprises: grouping one or more property records of the property data based on characteristics of the one or more property records, and for each property record group, determining an average ratio difference between a living area estimated using aerial imagery and a living area included in the property data for each property record in the respective property record group; where the computer-implemented method further comprises: training a machine learning model using training data to form the trained machine learning model, where the training data comprises, for one or more second data sources, how recent the respective second data source was updated, whether the respective second data source provides property data values that match property data values provided by other second data sources, a value representing how similar properties for which property data is provided by the respective second data source are to properties in surrounding neighborhoods, or a value representing the similarity of property types and styles of properties for which property data is provided by the respective second data source, and where each item in the training data is labeled with data indicating an accuracy of the respective second data source, and applying, as an input to the trained machine learning model, at least one of how recent the first data source was updated, whether the first data source provides property data values that match property data values provided by other data sources in the one or more data sources, a value representing how similar properties for which property data is provided by the first data source are to properties in surrounding neighborhoods, or a value representing the similarity of property types and styles of properties for which property data is provided by the first data source to determine an accuracy of the first data source; where the computer-implemented method further comprises: predicting a data value for one type of property data originating from the first data source using a second trained machine learning model, and modifying the property data to include the predicted data value; where each of the one or more aerial images is annotated to include a polygon defined by a set of geographic coordinates that fall within a location at which the respective aerial image is captured; where a first aerial image in the one or more aerial images is annotated to include a first polygon that partially overlaps at least two structures including the structure; and where the computer-implemented method further comprises: training a second machine learning model to predict to which structure a polygon is intended to surround, applying the first aerial image annotated with the first polygon as an input to the trained second machine learning model, and determining that the first polygon is intended to surround the structure based on an output of the trained second machine learning model.

Another aspect of the disclosure provides a non-transitory, computer-readable medium comprising computer-executable instructions for estimating a living area of a structure, where the computer-executable instructions, when executed by a computer system, cause the computer system to: determine an accuracy of property data originating from one or more data sources using a trained machine learning model; obtain the property data from a first data source in the one or more data sources having a highest determined accuracy; obtain a request for the living area of the structure; process one or more aerial images corresponding to the structure; and estimate a first living area of the structure based on the processing of the one or more aerial images.

The non-transitory, computer-readable medium of the preceding paragraph can include any sub-combination of the following features: where the computer-executable instructions, when executed, further cause the computer system to: determine a property group to which the structure belongs based on the obtained property data, modify the first living area of the structure by a ratio difference corresponding to the property group to which the structure belongs, determine a confidence score of the modified first living area, determine that the confidence score of the modified first living area is less than a threshold score, determine an adjustment metric for the structure based on a portion of the property data corresponding to the structure, adjust the modified first living area using the adjustment metric to form a second living area, determine a second confidence score of the second living area, and transmit, to a user device, either the modified first living area or the second living area based on the confidence score and the second confidence score; where each of the one or more aerial images is annotated to include a polygon defined by a set of geographic coordinates that fall within a location at which the respective aerial image is captured, and where a first aerial image in the one or more aerial images is annotated to include a first polygon that partially overlaps at least two structures including the structure; and where the computer-execution instructions, when executed, further cause the computer system to: train a second machine learning model to predict to which structure a polygon is intended to surround, apply the first aerial image annotated with the first polygon as an input to the trained second machine learning model, and determine that the first polygon is intended to surround the structure based on an output of the trained second machine learning model.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 4 is a flow diagram depicting an example, living area estimation routine 400 illustratively implemented by a living area estimation system, according to one embodiment.

DETAILED DESCRIPTION OF SPECIFIC EMBODIMENTS

Figure 1:
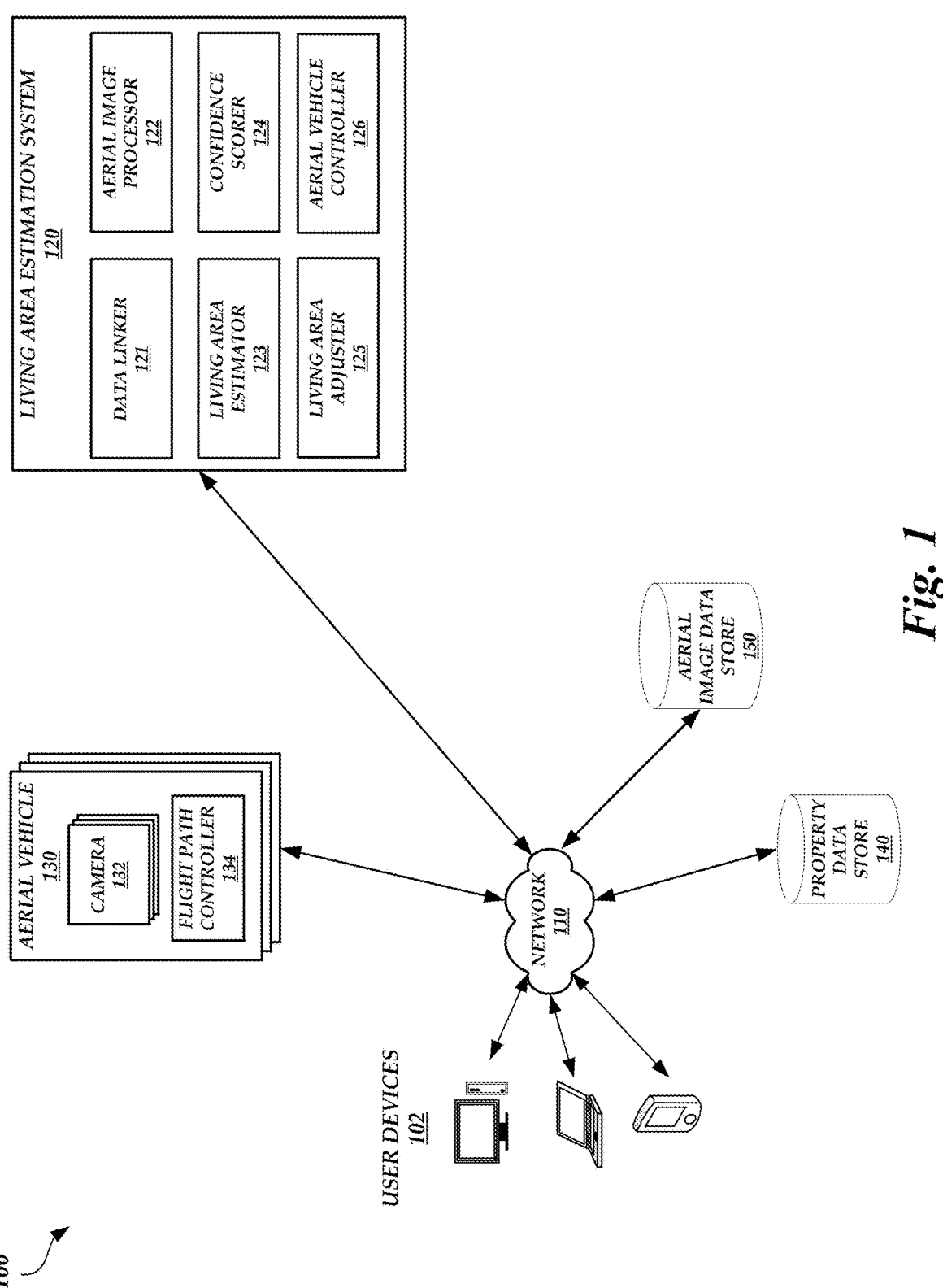
FIG. 1 is a block diagram of an illustrative operating environment in which a living area estimation system uses property data and/or aerial images to estimate the living area of a structure.

As described above, obtaining an accurate calculation or estimation of the living area can provide several benefits. It may be difficult, however, to obtain an accurate calculation or estimation of the living area. For example, manual measurements of the living area of a structure (e.g., measurements taken by a human) can be subjective and imprecise. In particular, one person may measure the exterior boundary of a structure to estimate the living area of the structure. However, this type of measurement may fail to take into account areas that are under the area of the roof, but that are not considered to be the living area (e.g., a garage, a porch, a terrace, a carport, a garage, a balcony, etc.). Another person may try to measure individual rooms and hallways within a structure, but the measurements may be imprecise due to human error (e.g., inaccurate measurements of individual rooms, inability to access certain areas of a floor plan that would be considered in the living area due to furniture or other obstructions, etc.). Even if one could take an accurate measurement of a structure, often it is impractical or impossible to access the structure to take a measurement in the first place.

To overcome the subjective and imprecise nature of manual, human measurements and/or to avoid the issue of certain structures being inaccessible, some systems obtain and process aerial images of structures to estimate the living area of the structures. For example, such systems can obtain an aerial image of the roof of a structure, process the aerial image to determine an area covered by the roof, and estimate the living area to be equal to the area determined using the aerial image processing. Estimating the living area based solely on aerial imagery, however, can lead to inaccurate results as well. Portions of a structure that fall under the roof may not be considered the living area. For example, a garage, carport, porch, terrace, balcony, and/or the like may be located under the roof and therefore be inaccurately incorporated into the estimate produced by the system that performs the aerial image processing. Because aerial images are overhead or oblique shots of the exterior of a structure, the systems that perform the image processing have no mechanism for determining whether the living area is the same for each floor of the structure. Thus, systems that use aerial image processing to overcome the subjective and imprecise nature of manual, human measurements still suffer from other technical deficiencies.

Accordingly, described herein is an improved living area estimation system that overcomes the technical deficiencies of systems that rely solely on aerial image processing and that provides results that are more objective and accurate than those produced by humans performing manual measurements. For example, the improved living area estimation system can obtain one or more aerial images of one or more structures and property data corresponding to one or more structures. The improved living area estimation system can then perform image processing on the aerial images to estimate a living area of each structure. Separately, the improved living area estimation system can obtain living area data present in the property data for each structure. Structures or properties that are located in similar geographical locations, that are in the same neighborhood, and/or that are the same property type (e.g., single family home, duplex, condominium, apartment, etc.) may have similar living area. Thus, the improved living area estimation system can group property records for the various structures based on one or more criterion (e.g., geographical location, neighborhood, property type, etc.) and, for each group of property records, determine the average difference between living area calculated using aerial images and living area included in the property data. For a structure for which one or more aerial images are available, but living area data (e.g., in property data) is not available, the improved living area estimation system can process the aerial image(s) to estimate living area and then modify this value by the average difference determined for the group to which the structure belongs to determine an estimated living area of the structure.

In addition, the improved living area estimation system can determine a confidence score for the structure for which living area is estimated from aerial image(s) and/or an average difference. For example, the improved living area estimation system can retrieve property data for the subject structure, identify statistics for the neighborhood within which the subject structure falls, and compare the estimated living area of the structure to typical living areas of structures in the neighborhood. The improved living area estimation system can calculate a confidence score for the structure based on the difference between the estimated living area and typical living areas in the neighborhood.

Once the confidence score is determined, the improved living area estimation system can determine whether any adjustments should be made to the estimated living area. For example, the improved living area estimation system may determine that an adjustment should be made if the confidence score is below a threshold value or percentile (e.g., 50%, 60%, 75%, etc.). To adjust the estimated living area, the improved living area estimation system can use the property data to identify features of the structure (e.g., garages, carports, terraces, porches, balconies, number of floors, etc.). For each property field (e.g., a garage, a carport, a terrace, a porch, a balcony, number of floors, etc.), the improved living area estimation system can determine an adjustment metric (e.g., a value representing an amount to increase or decrease an estimated living area, a percent representing an amount to increase or decrease an estimated living area, etc.). The improved living area estimation system can then adjust the estimated living area one or more times using each determined adjustment metric. The improved living area estimation system can use the techniques described above to determine a confidence score for the adjusted estimated living area and compare the two confidence scores (e.g., the confidence score for the estimated living area and the confidence score for the adjusted estimated living area). The improved living area estimation system may determine and output the living area that has the higher confidence score (e.g., the estimated living area or the adjusted estimated living area).

In this way, the improved living area estimation system performs aerial image processing, thereby addressing the technical deficiencies of subjective and imprecise human measurements. To address the technical deficiencies of typical systems that rely solely on aerial image processing, the improved living area estimation system also uses property data and confidence scoring to adjust initial living area estimates produced using aerial image processing to produce more accurate results.

Specifically, the improved living area estimation system described herein does not merely automate operations that otherwise are performed by a human. For example, a human may travel to a location of a structure to manually measure the structure to determine a living area. However, the improved living area estimation system performs different operations to estimate the living area. For example, the improved living area estimation system can estimate the living area of a structure using property data and image processing techniques without using or having access to a visual representation of the interior of the structure itself.

Furthermore, humans often make subjective determinations of structural measurements, and thus the in-person measurement performed by humans may be inaccurate. On the other hand, the improved living area estimation system can use the property data and image processing techniques to provide a more objective, accurate estimation of the living area. Thus, unlike the subjective determinations made by a human, the techniques implemented by the improved living area estimation system described herein can result in an objective determination of an estimated living area.

Moreover, as described herein, the improved living area estimation system can process aerial images to estimate at least in part a living area. Unlike humans who process images via electrical signals sent from the optic nerve to the primary visual cortex in the brain, the improved living area estimation system may use image processing techniques (e.g., a pixel-based analysis to identify edges, gradients, changes in color, etc.) to estimate the living area.

While the present disclosure is focused on estimating living area, this is not meant to be limiting. The techniques described herein can be used to estimate more accurately any type of measurement associated with a structure.

While the improved living area estimation system is described herein as processing aerial images captured by an aerial vehicle or images included in property data to estimate a living area, this is not meant to be limiting. For example, the improved living area estimation system can process any type of sensor data to estimate a living area. Such sensor data can include infrared imagery captured by the aerial vehicle, light detection and ranging (LIDAR) imagery captured by the aerial vehicle, satellite imagery, low-orbit imagery (e.g., imagery captured from an elevation lower than imagery captured by a satellite), and/or the like. The sensor data can be processed by the improved living area estimation system in the same manner as the aerial imagery to estimate a living area. In addition, the sensor data processed by the improved living area estimation system may not necessarily originate solely from an aerial vehicle or property data. For example, the improved living area estimation system can use images and/or text posted to social networks (that, for example, are geo-tagged or otherwise indicate or suggest a location from which an image was captured), alone or in combination with other sensor data, to estimate a living area. The improved living area estimation system can perform a search of social networks for images and/or text corresponding to a desired set of geographic coordinates in order to obtain the relevant images and/or text. The improved living area estimation system may use natural language processing techniques to process the text to identify any indication of a living area, features of the structure that should not be considered a living area, and/or the like.

Furthermore, while the improved living area estimation system is described herein as estimating the living area of a structure on a parcel, the structure is not limited to a building on the parcel. The structure can include fences, sheds, greenhouses, vehicles, and/or other physical objects located on the parcel that have a roof.

The foregoing aspects and many of the attendant advantages of this disclosure will become more readily appreciated as the same become better understood by reference to the following detailed description, when taken in conjunction with the accompanying drawings.

Example Living Area Estimation Environment

FIG. 1 is a block diagram of an illustrative operating environment 100 in which a living area estimation system 120 uses property data and/or aerial images to estimate the living area of a structure. The operating environment 100 further includes one or more aerial vehicles 130 that may communicate with the living area estimation system 120 via a network 110 to receive flight path parameters and provide aerial images. In addition, the operating environment 100 includes one or more property data stores 140 and one or more aerial image data stores 150 with which the living area estimation system 120 may communicate via the network 110 to obtain data used in estimating the living area. Furthermore, the operating environment 100 includes various user devices 102 that may communicate with the living area estimation system 120 to receive flight path parameters and/or to request the living area of a particular structure.

The aerial vehicle 130 may be a manned or unmanned aerial vehicle. For example, the aerial vehicle 130 may be a plane, helicopter, drone, blimp, balloon, and/or the like. In some embodiments, two or more manned and/or unmanned aerial vehicles may be used concurrently at a given site to perform the functionality described herein with respect to a single aerial vehicle 130. The aerial vehicle 130 may include one or more cameras 132. For example, the camera(s) 132 may be high-resolution camera(s) (e.g., 4K, 8K, etc.). The camera(s) 132 may be mounted to a bottom and/or side surface of the aerial vehicle 130 such that the camera(s) 132 can capture images of the land underneath the aerial vehicle 130. One or more of the cameras 132 may include a network interface to communicate with the living area estimation system 120 via the network 110 (or via a wired or wireless point-to-point link). Alternatively, the cameras 132 may transmit data (e.g., captured images) to a network interface (not shown) or input/output device (not shown) of the aerial vehicle 130 for eventual transmission to the living area estimation system 120.

Optionally, an unmanned aerial vehicle 130 may further include a flight path controller 134. The flight path controller 134 may communicate with the living area estimation system 120 to receive flight path parameters. For example, flight path parameters may include a flight path (e.g., one or more geographic coordinates, waypoints, flight length, flight time, speed, altitude, etc.), a shooting angle (e.g., an angle at which one or more cameras 132 is positioned to capture images), camera resolution, and/or the like. Alternatively, the flight path controller 134 can communicate directly with a user device 102, such as a user device 102 present at a site with the aerial vehicle 130. The user device 102 may then communicate with the living area estimation system 120.

Upon receiving flight path parameters, the flight path controller 134 can control the operation of the aerial vehicle 130 according to the flight path parameters. For example, the flight path controller 134 can transmit instructions to various components of the aerial vehicle 130 to cause the aerial vehicle 130 to take off from a current location, follow a certain flight path, instruct the camera(s) 132 to capture images at the appropriate time and at the appropriate angle, and land once the flight is complete. Commercially available drones and associated code may provide such features. In some embodiments, the living area estimation system 120 can transmit updated flight path parameters to the flight path controller 134 while the aerial vehicle 130 is in flight. When updated flight path parameters are received in flight, the flight path controller 134 can transmit instructions to various components of the aerial vehicle 130 to cause the aerial vehicle 130 to adjust flight according to the updated flight path parameters.

The flight path controller 134 may further include instructions that, when executed, cause the aerial vehicle 130 to deviate from the selected flight path at the instruction of a user and/or automatically. For example, the aerial vehicle 130 can transmit captured images in real-time (e.g., as the images are captured) to the living area estimation system 120. The living area estimation system 120 (e.g., the aerial image processor 122 described below) may provide one or more user devices 102 with access to the captured images as they are received during a flight. For example, the living area estimation system 120 may generate user interface data that is transmitted to a user device 102 and that causes the user device 102 to display a user interface showing the images as the images are captured by the one or more cameras 132. A user viewing the user interface and captured images may notice an object of interest and can use controls provided by the user interface to transmit instructions to the aerial vehicle 130 via the living area estimation system 120 that causes the aerial vehicle 130 to return to the location where the object of interest was noticed.

The living area estimation system 120 can be a computing system configured to estimate the living area of a structure. For example, the living area estimation system 120 can obtain property data and/or aerial image data from external data sources and use some or all of the data to estimate the living area. In some embodiments, the living area estimation system 120 may further use some or all of the data to generate flight path parameters for capturing images of a particular structure, to process received images to identify the living area, and/or the like.

The living area estimation system 120 may be a single computing device, or it may include multiple distinct computing devices, such as computer servers, logically or physically grouped together to collectively operate as a server system. The components of the living area estimation system 120 can each be implemented in application-specific hardware (e.g., a server computing device with one or more ASICs) such that no software is necessary, or as a combination of hardware and software. In addition, the modules and components of the living area estimation system 120 can be combined on one server computing device or separated individually or into groups on several server computing devices. In some embodiments, the living area estimation system 120 may include additional or fewer components than illustrated in FIG. 1.

In some embodiments, the features and services provided by the living area estimation system 120 may be implemented as web services consumable via the communication network 110. In further embodiments, the living area estimation system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The living area estimation system 120 may include various modules, components, data stores, and/or the like to provide the roof area estimation functionality described herein. For example, the living area estimation system 120 may include a data linker 121, an aerial image processor 122, a living area estimator 123, a confidence scorer 124, a living area adjuster 125, and an aerial vehicle controller 126.

The data linker 121 can obtain aerial images corresponding to one or more structures from the aerial image data store(s) 150 and/or from an aerial vehicle 130 and can obtain property data corresponding to one or more structures from the property data store(s) 140. Property data can include features of a structure (e.g., garages, car spaces, basements, attics, foyers, porches, balconies, number of floors, etc.), living area of a structure, square footage of one or more features of a structure, geographic coordinates that define a location of a structure, property type, and/or the like. The property data stored in the property data store(s) 140 may originate from real estate listings, assessor reports, and/or appraisals.

In some embodiments, property models and/or statistics may be applied to the property data prior to storage of the property data in the property data store(s) 140 to ensure that the property data is as accurate as possible. For example, the data linker 121 or another computing system (not shown) can rank the data sources from which the property data may originate to ensure that the property data used by the living area estimation system 120 is as accurate as possible. In some case, the property data from a data source may be inaccurate due to human or machine error (e.g., a human may enter the data from physical records incorrectly and/or with typographical errors; a computing system may attempt to digitize physical records, but there may be errors in the scan or object character recognition performed on the scan; etc.). As a result, property data from a data source corresponding to one region may be more accurate than the property data from a data source corresponding to a different region.

To address these technical issues, the data linker 121 or other computing system can use machine learning to estimate which data source of a set of data sources that provide property data of a certain type (e.g., real estate listings, assessor reports, appraisals, etc.) has the most accurate data. For example, the data linker 121 or other computing system can use training data to train a machine learning model, where the training data includes, for one or more data sources, how recent the respective data source was updated, whether the respective data source provides property data values that match property data values provided by other data sources, a value representing how similar properties for which property data is provided by the respective data source are to properties in surrounding neighborhoods, a value representing the similarity of property types and styles of properties for which property data is provided by the respective data source, and/or the like labeled with data indicating an accuracy of the respective data source. Once trained, the data linker 121 or other computing system can provide characteristics of a data source as an input to the trained machine learning model, which causes the trained machine learning model to output a value representing an accuracy of the data source, where the characteristics can include how recent the data source was updated, whether the data source provides property data values that match property data values provided by other data sources, a value representing how similar properties for which property data is provided by the data source are to properties in surrounding neighborhoods, a value representing the similarity of property types and styles of properties for which property data is provided by the data source, and/or the like. The data linker 121 or other computing system can repeat these operations one or more times to obtain values or scores representing the accuracy of one or more data sources. The data linker 121 or other computing system can use the values or scores to rank the data sources, thereby determining the most accurate or a set of most accurate data sources. Thus, the data linker 121 or other computing system can cause the property data store(s) 140 to store property data originating from the most accurate or the set of most accurate data sources.

In further embodiments, the data linker 121 and/or other computing system can use machine learning to generate predicted data to backfill empty fields in the property data and/or replace values in the property data. For example, the data linker 121 or other computing system can predict attributes from geographical clustering/profiling, can use deep learning models to predict data, can use probabilistic statistical models to predict data, can use reinforced learning to predict data, can use outlier detection models to predict data, and/or the like. The data linker 121 may use one or more of these methods and/or models to perform the prediction and identify missing property data values and/or correct inaccurate property data values. In particular, the data linker 121 can train a machine learning model using sample property records that are each assigned to a group (where each property record may be assigned a group using one or more criteria (e.g., by county, subdivision, tract number, street name, zip code, etc.)) and that are each labeled with one or more building characteristics. The training may result in a model that represents one or more geographic-based building characteristics clusters. The data linker 121 may separately group properties by one or more criteria (e.g., by county, subdivision, tract number, street name, zip code, etc.). For some or all of the properties, the data linker 121 can apply as an input to the trained machine learning model an indication of a group assigned to the respective property, and the trained machine learning model may output likely building characteristics of the property given the assigned grouping, also outputting a confidence score that indicates how close the input property is to one of the building characteristic clusters.

To implement deep learning, the data linker 121 can train a deep learning model by identifying property records that are each assigned to a group (where each property record may be assigned a group using one or more criteria (e.g., by county, subdivision, tract number, street name, zip code, etc.)) and each labeled to indicate a property data value and using those property records as a training data set. The data linker 121 may separately group properties by one or more criteria (e.g., by county, subdivision, tract number, street name, zip code, etc.). For some or all of the properties, the data linker 121 can apply as an input to the trained deep learning model an indication of a group assigned to the respective property, and the trained deep learning model may output a likely property data value given the assigned grouping. The data linker 121 may periodically test the accuracy of the trained deep learning model by comparing a set of outputs to a test data set (e.g., properties where multiple sources give the same values for one or more property data) and determining how many outputs match a property data value in the test data set.

To implement probabilistic statistical models, the data linker 121 can use statistical techniques (e.g., frequentist to look at general distribution, Bayesian to look at probabilities of observed data, etc.) to find a distribution of property data values after performing a grouping, such as a grouping described above. The data linker 121 may train the probabilistic statistical machine learning model using property records that are grouped, where the property records are grouped in groupings with a high volume count and tested against highly confident records (such as in a manner as described above with respect to deep learning). When presented with a property record that has a missing property data field value as an input by the data linker 121, the trained probabilistic statistical machine learning model may output a most likely value for the missing property data field value.

To implement outlier detection, the data linker 121 can analyze data after another model has already been used by the data linker 121 to identify a missing property data field value. For example, the data linker 121 can generate an ensemble model to determine if any identified missing property data field value is detected as an outlier (even if one of the previously used models outputs a high confidence score). Data linker 121 may use one or more anomaly detection models to detect an outlier, where the anomaly detection model may output a confidence score that indicates a likelihood that an inputted value is an outlier. If an outlier is detected, the data linker 121 may not modify the original property data source with the missing property data field value identified by the previous model(s). Example anomaly detection models include isolation forest for density based clustering, mahalanobis distance to determine confidence at a record level, and/or hidden Markov Models for probability of outlier. The anomaly detection model(s) may be trained using grouped property records, such as the types of grouped property records described above.

To implement reinforced learning, the data linker 121 can take a property record that is suspected by the anomaly detection model to have an outlier value and performs a learning method to create changes to the identified missing property data field value. The data linker 121 can check if the created changes are better than the previously identified missing property data field value (e.g., determine if a newly identified property data field value is less of an outlier than the identified missing property data field value by applying the newly identified property data field value as an input to the anomaly detection model and comparing the confidence score outputted by the anomaly detection model to the confidence score outputted when the previously identified missing property data field value was applied as an input to the anomaly detection model and determining whether the confidence score for the newly identified property data field value is lower than the confidence score for the previously identified missing property data field value). The data linker 121 can repeat this operation one or more times (e.g., if the learning model produces multiple possible new missing property data field values) until the data linker 121 has identified the best missing property data field value (e.g., a value that is associated with the lowest confidence score output by the anomaly detection model (e.g., a value that is least likely to be an outlier)).

Once data is predicted, the data linker 121 or other computing system can modify property data stored in the property data store(s) 140 to include the predicted data (e.g., by adding the predicted data, replacing one or more existing values with the predicted data, etc.) and/or can modify the property data prior to the property data being stored in the property data store(s) 140. For example, the machine learning model may not only output a predicted property data value, but also a confidence score associated with the predicted property data value. If the confidence score exceeds a threshold value, then the data linker 121 and/or other computing system may modify the property data to include the predicted data. Otherwise, if the confidence score does not exceed a threshold value, then the data linker 121 and/or other computing system may not modify the property data to include the predicted data, thereby using the original value present in the property data. A high volume of data obtained by the data linker 121 or other computing system from other data sources may allow the machine learning to produce more accurate results and enhance the accuracy of the property data being used. Thus, the data linker 121 and/or other computing system can use machine learning to identify and use accurate data sources and/or to enhance the accuracy of the property data being used.

The data linker 121 can then link the aerial images to the property data. For example, each aerial image may be associated with one or more geographic coordinates that define a location at which the aerial image is taken. Similarly, the property data may include one or more geographic coordinates that define a location at which a structure is located. In some embodiments, each aerial image is annotated to include a partial or complete polygon defined by a set of geographic coordinates that fall within a location at which the respective aerial image is taken. In some cases, the partial or complete polygon surrounds a single property or structure. Thus, the partial or complete polygon may be defined by a set of geographic coordinates that matches or nearly matches (e.g., within 0.1 degrees, 0.01 degrees, 0.001 degrees, etc.) the one or more geographic coordinates that define a location at which a structure is located per the property data, and the data linker 121 can link the corresponding aerial image to the corresponding property data.

In other cases, the partial or complete polygon overlaps at least two properties or structures. The data linker 121 can determine to which property or structure the partial or complete polygon is intended to surround. For example, the data linker 121 can train and/or use a machine learning model trained to predict to which property or structure the partial or complete polygon is intended to surround (e.g., train using a training data set that includes aerial images with polygons that overlap two or more properties or structures and that are annotated to indicate to which property or structure the respective polygon is intended to surround). As another example, the data linker 121 determine which property or structure is closer to a centroid of the partial or complete polygon, and select that property or structure as the one that the partial or complete polygon is intended to surround. Once the data linker 121 has determine to which property or structure the partial or complete polygon is intended to surround, the data linker 121 can link the aerial image with the property data of the determine property or structure.

The data linker 121 may link an aerial image with property data for one structure or for multiple structures. For example, apartments or condominiums may be stacked on top of each other and therefore have the same geographic coordinates. The aerial image may therefore corresponding to multiple apartments, condominiums, and/or the like.

The aerial image processor 122 can process aerial images to estimate a living area of the linked structures. For example, the aerial image processor 122 can, for each aerial image, perform a pixel analysis of the respective aerial image to identify pixels of the respective aerial image that are edges that may represent the exterior boundary of the structure. The image resolution and/or scale of the aerial image may be known, and therefore the aerial image processor 122 can estimate the living area of the structure in the respective aerial image by calculating the area created by the detected edges using the known image resolution and/or scale.

Separately, as described herein, the property data may include information indicating the living area of various structures. The property data may also include geographical and/or property type information of various structures. Structures or properties that are located in similar geographical locations, that are in the same neighborhood, and/or that are the same property type (e.g., single family home, duplex, condominium, apartment, etc.) may have similar living area. Thus, the data linker 121 can group property records for the various structures based on one or more criterion (e.g., geographical location, neighborhood, property type, etc.). The data linker 121 may set a minimum threshold for the number of property records that can form a group, thereby discarding or removing any property records groups that do not have at least a number of group members that meets the minimum threshold. Thus, the data linker 121 may form one or more groups of property records, where each group corresponds to one or more structures that have the same or similar geographical, neighborhood, and/or property type characteristics.

For each property record in each property record group, the data linker 121 can determine the ratio or percentage difference between the living area indicated by the property data of the respective property record and the living area calculated using the aerial image linked to the property data. Once the ratio or percentage differences are determined for some or all of the property records in a group, the data linker 121 can average (or perform any other statistical operation on) the ratio or percentage differences and store the average ratio or percentage differences locally.

For a structure for which one or more aerial images are available, but living area data (e.g., in property data) is not available, the living area estimator 123 can use the average ratio or percentage differences to estimate the living area of the structure. For example, a user device 102 can submit a request for the living area of a structure. The living area estimator 123 can obtain one or more aerial images of the structure and request the aerial image processor 122 to estimate an living area of the structure using the aerial image(s). The living area estimator 123 can separately determine a property record group to which the structure belongs. For example, the living area estimator 123 can obtain geographical, neighborhood, and/or property type information about the structure (e.g., from the user device 102 or the property data) and can determine a property record group that most closely aligns with the characteristics of the structure. The living area estimator 123 can then retrieve the average ratio or percentage difference for the determined property record group and modify the living area estimated by the aerial image processor 122 using the retrieved average ratio or percentage difference (e.g., multiply the estimated living area by the average ratio or percentage difference) to determine an initial estimated living area of the structure. If the living area estimator 123 determines that the structure does not belong to any property record group, then the living area estimator 123 may determine an initial estimated living area of the structure to be the living area estimated by the aerial image processor 122.

Once the initial estimated living area of the structure is determined, the confidence scorer 124 can determine a confidence score of the initial estimate. For example, the confidence scorer 124 can obtain property data from the property data store(s) 140. The confidence scorer 124 group the property records by geographic location (e.g., group together property records corresponding to the same or adjacent neighborhood) and determine neighborhood statistics for each grouping. The neighborhood statistics can include the average living area of structures in a grouping, the standard deviation of living area of structures in a grouping, the variance of living area of structures in a grouping, and/or the like. The confidence scorer 124 can then compare the initial estimated living area of the structure to at least one of the neighborhood statistics of the group to which the structure belongs. The confidence scorer 124 can then set a confidence score based on the difference between the initial estimated living area of the structure and the neighborhood statistic (e.g., the average living area of structures in the grouping), where the confidence score is higher the smaller the difference. As an illustrative example, if the initial estimated living area of the structure is equal to the neighborhood statistic, then the confidence score may be 100%; if the initial estimated living area of the structure is within 5% of the neighborhood statistic, then the confidence score may be 95%; if the initial estimated living area of the structure is within 10% of the neighborhood statistic, then the confidence score may be 90%; and so on.

The living area adjuster 125 can optionally adjust the initial estimated living area of the structure if the confidence score is lower than a threshold level. For example, if the confidence score determined by the confidence scorer 124 is less than the threshold level, then the living area adjuster 125 can obtain property data from the property data store(s) 140 and can, for each field in the property data, calculate an adjustment metric based on neighborhood statistics of the group (e.g., the group determined by the confidence scorer 124) to which the structure belongs. As an illustrative example, the living area adjuster 125 can calculate an adjustment metric for some or all of the structure features field, the living area field, the geographic coordinates field, the property type field, and/or the like. The adjustment metric may indicate a number or percentage by which the initial estimated living area of the structure should be increased or decreased. For the structure features field in particular, the living area adjuster 125 can use the neighborhood statistics to determine the mean, median, mode, standard deviation, variance, etc. square footage of a garage (or terrace, carport, balcony, etc.) in structures in the subject group to which the structure belongs, and set the adjustment metric to be equal to or about the same as the determined mean, median, mode, standard deviation, variance, etc. square footage of a garage in structures in the subject group to which the structure belongs. Generally, the adjustment metric may be a negative value or marked to indicate that the adjustment should be downward. However, an adjustment metric can be positive or marked to indicate that the adjustment should be upward as well.

After calculating one or more adjustment metrics, the living area adjuster 125 can apply one or all of the adjustment metrics to the initial estimated living area of the structure (e.g., reduce and/or increase the initial estimated living area of the structure by the value that the adjustment metric represents) to determine a modified estimated living area of the structure. The confidence scorer 124 can repeat some or all of the operations described herein to determine a confidence score for the modified estimated living area of the structure, and the living area adjuster 125 can compare the confidence score of the initial estimated living area of the structure with the confidence score of the modified estimated living area of the structure. The living area adjuster 125 may determine that the living area estimate that has the highest confidence score will be the final estimated living area of the structure, and this estimate may be provided to the requesting device (e.g., the user device 102).

In response to receiving a request from the data linker 121 or aerial image processor 122 to instruct an aerial vehicle 130 to capture images, the aerial vehicle controller 126 may generate flight path parameters based on the geographic location of the specified structure(s). For example, the aerial vehicle controller 126 may generate flight path parameters such that the aerial vehicle 130 flies in a pattern that allows the aerial vehicle 130 to capture images of some or all of the roof of the specified structure(s).

In some embodiments, a manned aerial vehicle 130 uses the flight path parameters to conduct the flight and capture the images. For example, once the aerial vehicle controller 126 determines the flight path parameters, the aerial vehicle controller 126 may transmit the flight path parameters to a user device 102, other system, or the aerial vehicle 130 itself. A pilot may then fly the aerial vehicle 130 according to the flight path parameters. The manned aerial vehicle 130 may conduct a flight over an area in which the specified structure is located. The camera(s) 132 and/or a network interface (not shown) may transmit captured images to the image processor 123 in real-time (e.g., as the images are captured) and/or after the flight is complete.

In other embodiments, an unmanned aerial vehicle 130 uses the flight path parameters to conduct the flight and capture the images. For example, once the aerial vehicle controller 126 determines the flight path parameters, a user may bring the unmanned aerial vehicle 130 to the site (e.g., based on a notification provided by the living area estimation system 120). The aerial vehicle controller 126 can transmit the flight path parameters to the aerial vehicle 130 over the network 110 and instruct the aerial vehicle 130 (e.g., the flight path controller 134) to begin the flight. The aerial vehicle 130 (e.g., the flight path controller 134) may communicate with a satellite system (e.g., a GPS system) and/or terrestrial system to fly according to the received flight path parameters. As the aerial vehicle 130 travels along the indicated flight path, the aerial vehicle 130 captures images of the land underneath the aerial vehicle 130 at a selected interval and in a manner determined by the shooting angle using the one or more cameras 132. For example, the one or more cameras 132 can capture images directly underneath the aerial vehicle 130 (e.g., the camera(s) 132 may be positioned such that a lens is approximately parallel with the land, facing straight down) and/or at an angle (e.g., the camera(s) 132 may be positioned such that a lens deviates from being parallel with the land by a certain angle). The camera(s) 132 and/or a network interface (not shown) may transmit captured images to the data linker 121 and/or aerial image processor 122 in real-time (e.g., as the images are captured) and/or after the flight is complete.

The property data store 140 may store property data associated with one or more structures on one or more parcels. While the property data store 140 is depicted as being external to the living area estimation system 120, this is not meant to be limiting. For example, not shown, the property data store 140 can be located internal to the living area estimation system 120.

The aerial image data store 150 may store aerial images of one or more structures on one or more parcels. While the aerial image data store 150 is depicted as being external to the living area estimation system 120, this is not meant to be limiting. For example, not shown, the aerial image data store 150 can be located internal to the living area estimation system 120.

Example Block Diagrams for Estimating Living Area

Figure 2:
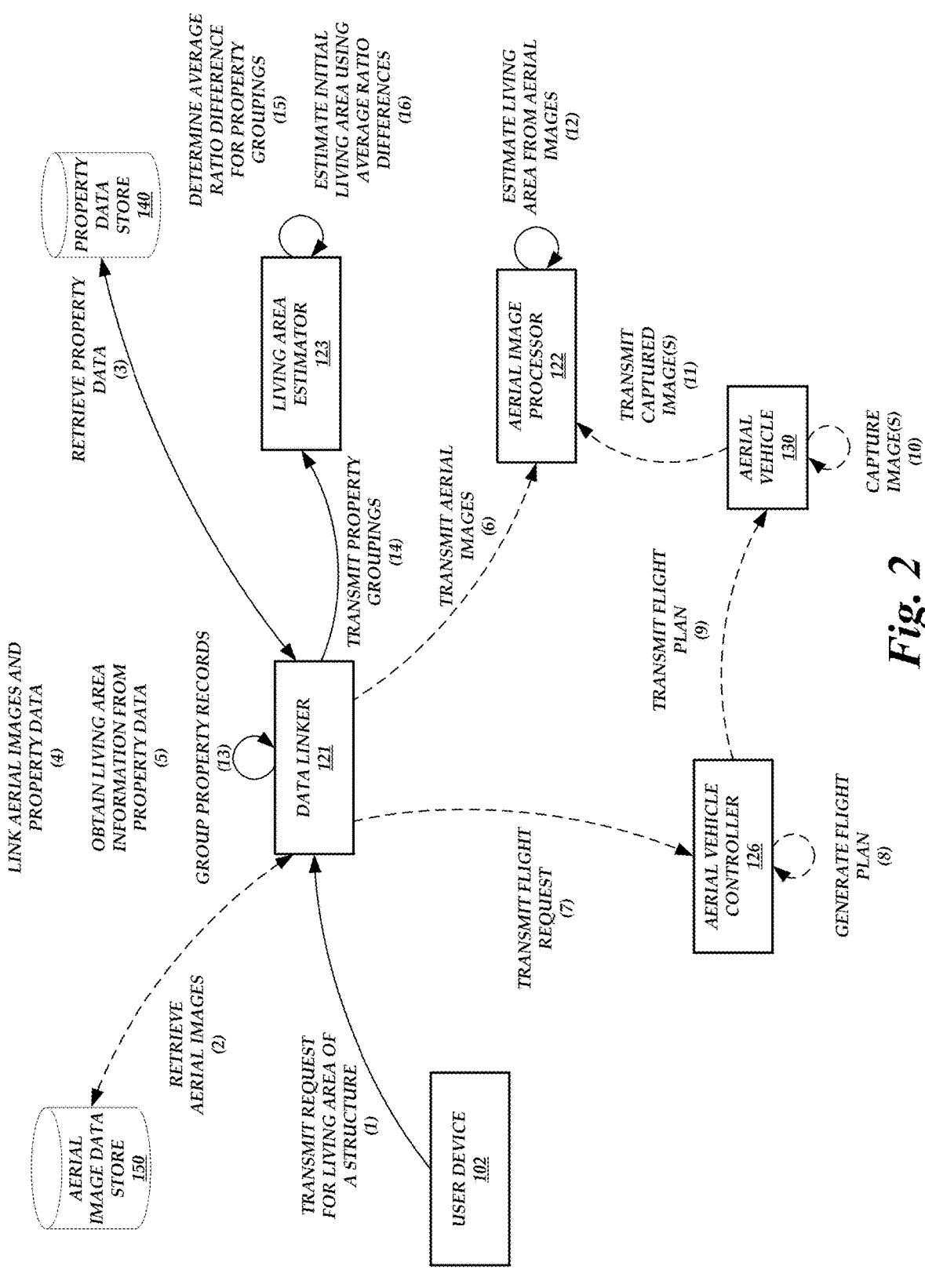
FIG. 2 is a flow diagram illustrating the operations performed by the components of the operating environment of FIG. 1 to estimate an initial living area of a structure.

FIG. 2 is a flow diagram illustrating the operations performed by the components of the operating environment

100 of FIG. 1 to estimate an initial living area of a structure. As illustrated in FIG. 2, a user device 102 transmits a request for the living area of a structure at (1). The user device 102 may transmit the request via a user interface.

The data linker 121 may receive the request, and optionally retrieve aerial images from the aerial image data store 150 at (2) and retrieve property data from the property data store 140 at (3). The data linker 121 can link individual aerial images with individual the property data elements at (4), such as by analyzing and matching geographical coordinate information associated with the aerial images (e.g., partial or complete polygons defined by a set of geographic coordinates) and present in the property data. The property data may include living area information, and the data linker 121 can obtain this living area information from the property data at (5).

If the data linker 121 obtains the aerial images from the aerial image data store 150, the data linker 121 can transmit the aerial images to the aerial image processor 122 at (6). Alternatively, the data linker 121 may request the aerial images. For example, the data linker 121 can transmit a flight request to the aerial vehicle controller 126 at (7). The aerial vehicle controller 126 can generate a flight plan (e.g., a set of flight parameters) at (8) and transmit the flight plan to the aerial vehicle at (9). The aerial vehicle 130 can fly according to the flight plan and capture image(s) of the roof of the structure(s) at (10) and transmit the captured image(s) to the aerial image processor 122 at (11) and/or to the data linker 121 (which may then be used by the data linker 121 to link to the property data per (5)).

The aerial image processor 122 may estimate living area of one or more structures from the aerial images at (12). Before, during, and/or after the aerial image processor 122 estimates living area, the data linker 121 can group property records together at (13), such as by geographic location, neighborhood, and/or property type. The data linker 121 can then transmit the property groupings to the living area estimator 123 at (14).

The living area estimator 123 can determine an average ratio difference for property groupings at (15). For example, the living area estimator 123 can take the living area information present in the property data and the living area estimated from the aerial images to determine, for each property group and each structure that belongs to the group, the average difference between the living area information present in the property data corresponding to the respective structure and the living area estimated from an aerial image of the respective structure. The living area estimator 123 can then estimate an initial living area for the structure requested by the user device 102 using the average ratio difference of the property group to which the requested structure belongs at (16).

While FIG. 2 depicts a numbered set of operations, the numbering is not meant to limit the order in which the operations are performed. For example, operations (2), (3) through (6), (7) through (11), and/or (12) through (15) may be performed prior to the user device transmitting a request for the living area of a structure.

Figure 3:
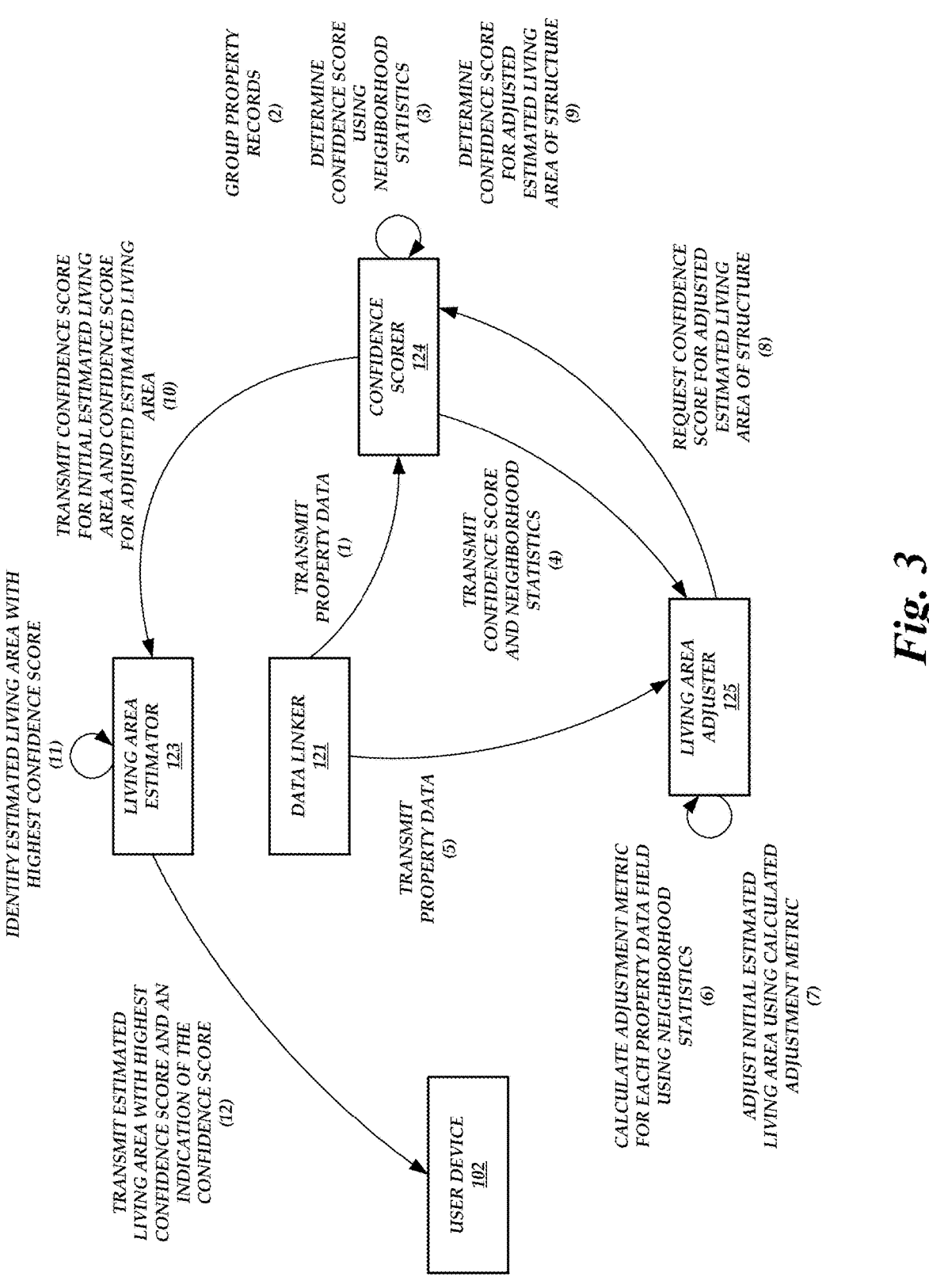
FIG. 3 is a flow diagram illustrating the operations performed by the components of the operating environment of FIG. 1 to optionally adjust an initial estimate of a living area of a structure.

FIG. 3 is a flow diagram illustrating the operations performed by the components of the operating environment 100 of FIG. 1 to optionally adjust an initial estimate of a living area of a structure. As illustrated in FIG. 3, the data linker 121 transmits property data to the confidence scorer 124 at (1). Alternatively, the confidence scorer 124 obtains the property data from the property data store(s) 140.

The confidence scorer 124 can group property records at (2), such as by geographical location. Once grouped, the confidence scorer 124 can determine a confidence score at (3) for the initial estimated living area using neighborhood statistics for the group in which the requested structure belongs. For example, the neighborhood statistics can include average living area in a particular neighborhood. The confidence scorer 124 can transmit the confidence score and/or the neighborhood statistics to the living area adjuster 125 at (4).

The data linker 121 can transmit property data to the living area adjuster 125 at (5), or alternatively the living area adjuster 125 can obtain the property data from the property data store(s) 140. The living area adjuster 125 can calculate an adjustment metric for some or all property data fields using the neighborhood statistics at (6). The adjustment metric(s) may be calculated for the structure requested by the user device 102 as described above with respect to FIG. 2. Once the adjustment metric(s) are calculated, the living area adjuster 125 can adjust the initial estimated living area of FIG. 2 downward and/or upward using the calculated adjustment metric(s) at (7).

The living area adjuster 125 can request a confidence score for the adjusted estimated living area of the property at (8), and the confidence scorer 124 can determine a confidence score for the adjusted estimated living area of the structure at (9). The confidence scorer 124 can transmit the confidence score for the initial estimated living area and the confidence score for the adjusted estimated living area to the living area estimator 123 at (10) and/or to the living area adjuster 125.

The living area estimator 123 (or the living area adjuster 125) can identify the estimated living area with the highest confidence score at (11), and select this estimated living area as the one that will be return to the user device 102 to satisfy the user device 102 request of FIG. 2. As a result, the living area estimator 123 (or the living area adjuster 125) can transmit the estimated living area with the highest confidence score and an indication of the confidence score to the user device 102 at (12) to satisfy the request of FIG. 2.

While FIG. 3 depicts a numbered set of operations, the numbering is not meant to limit the order in which the operations are performed.

Example Living Area Estimation Routine

FIG. 4 is a flow diagram depicting an example, living area estimation routine 400 illustratively implemented by a living area estimation system, according to one embodiment. As an example, the living area estimation system 120 of FIG. 1 can be configured to execute the living area estimation routine 400. The living area estimation routine 400 begins at block 402.

At block 404, property records are grouped using property data. For example, the property records can be grouped according to geography, neighborhood, and/or property type.

At block 406, average differences between aerial image living area estimates and property data living area data is determined for each group. For example, the differences can be whole numbers, percentages, and/or the like.

At block 408, an estimated living area for a property is determined using the determined average differences. Specifically, the living area may be estimated by multiplying the living area of a structure estimated from an aerial image by the average difference for the group within which the structure belongs.

At block 410, a confidence score is determined for the estimated living area. The confidence score may be determined based on living areas of structures in the same neighborhood as a subject structure.

At block 412, an adjustment to the estimated living area is determined. For example, the adjustment may be a numerical value that represents an amount by which a living area estimate should be increased or reduced due to certain property features, such as garages (decrease), attics (decrease), live-in basements (increase), balconies (decrease), etc.

At block 414, one of the estimated living area or an adjusted estimated living area is selected based on which has the highest confidence score. The selected estimate may then be provided to a user device 102. After the selection is made, the living area estimation routine 400 proceeds to block 416 and ends.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to request a living area of a structure, view captured images, set flight path parameters, modify a flight path during flight, and/or view a building description of a desired structure.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for estimating a living area of a structure, the system comprising:
memory that stores computer-executable instructions; and
a processor in communication with the memory, wherein the computer-executable instructions, when executed by the processor, cause the processor to:
determine an accuracy of property data originating from one or more data sources using a trained machine learning model;

obtain the property data from a first data source in the one or more data sources having a highest determined accuracy;
obtain a request for the living area of the structure;
process one or more aerial images corresponding to the structure;
estimate a first living area of the structure based on the processing of the one or more aerial images;
determine a property group to which the structure belongs based on the obtained property data;
modify the first living area of the structure by a ratio difference corresponding to the property group to which the structure belongs;
determine a confidence score of the modified first living area;
determine that the confidence score of the modified first living area is less than a threshold score;
determine an adjustment metric for the structure based on a portion of the property data corresponding to the structure;
adjust the modified first living area using the adjustment metric to form a second living area;
determine a second confidence score of the second living area; and
transmit, to a user device, either the modified first living area or the second living area based on the confidence score and the second confidence score.

2. The system of claim 1, wherein the adjustment metric corresponds to one of a garage, terrace, carport, or balcony of the structure.

3. The system of claim 1, wherein the computer-executable instructions, when executed, further cause the processor to:
group one or more property records of the property data based on characteristics of the one or more property records; and
for each property record group, determine an average ratio difference between a living area estimated using aerial imagery and a living area included in the property data for each property record in the respective property record group.

4. The system of claim 1, wherein the computer-executable instructions, when executed, further cause the processor to:
train a machine learning model using training data to form the trained machine learning model, wherein the training data comprises, for one or more second data sources, how recent the respective second data source was updated, whether the respective second data source provides property data values that match property data values provided by other second data sources, a value representing how similar properties for which property data is provided by the respective second data source are to properties in surrounding neighborhoods, or a value representing the similarity of property types and styles of properties for which property data is provided by the respective second data source, and wherein each item in the training data is labeled with data indicating an accuracy of the respective second data source; and
apply, as an input to the trained machine learning model, at least one of how recent the first data source was updated, whether the first data source provides property data values that match property data values provided by other data sources in the one or more data sources, a value representing how similar properties for which property data is provided by the first data source are to properties in surrounding neighborhoods, or a value representing the similarity of property types and styles of properties for which property data is provided by the first data source to determine an accuracy of the first data source.

5. The system of claim 1, wherein the computer-executable instructions, when executed, further cause the processor to:

predict a data value for one type of property data originating from the first data source using a second trained machine learning model; and modify the property data to include the predicted data value.

6. The system of claim 1, wherein each of the one or more aerial images is annotated to include a polygon defined by a set of geographic coordinates that fall within a location at which the respective aerial image is captured.

7. The system of claim 6, wherein a first aerial image in the one or more aerial images is annotated to include a first polygon that partially overlaps at least two structures including the structure.

8. The system of claim 7, wherein the computer-executable instructions, when executed, further cause the processor to:

train a second machine learning model to predict to which structure a polygon is intended to surround;

apply the first aerial image annotated with the first polygon as an input to the trained second machine learning model; and determine that the first polygon is intended to surround the structure based on an output of the trained second machine learning model.

9. The system of claim 7, wherein the computer-executable instructions, when executed, further cause the processor to:

determine that a centroid of the first polygon is closer to the structure; and determine that the first polygon is intended to surround the structure.

10. The system of claim 1, wherein the computer-executable instructions, when executed, further cause the processor to perform a pixel analysis of the one or more aerial images to identify pixels of the one or more aerial images that are edges that represent an exterior boundary of the structure.

11. A computer-implemented method for estimating a living area of a structure, the computer-implemented method comprising:

determining an accuracy of property data originating from one or more data sources using a trained machine learning model;

obtaining the property data from a first data source in the one or more data sources having a highest determined accuracy;

obtaining a request for the living area of the structure;

processing one or more aerial images corresponding to the structure;

estimating a first living area of the structure based on the processing of the one or more aerial images;

determining a property group to which the structure belongs based on the obtained property data;

modifying the first living area of the structure by a ratio difference corresponding to the property group to which the structure belongs;

determining a confidence score of the modified first living area;

determining that the confidence score of the modified first living area is less than a threshold score;

determining an adjustment metric for the structure based on a portion of the property data corresponding to the structure;

adjusting the modified first living area using the adjustment metric to form a second living area;

determining a second confidence score of the second living area; and transmitting, to a user device, either the modified first living area or the second living area based on the confidence score and the second confidence score.

12. The computer-implemented method of claim 11, further comprising:

grouping one or more property records of the property data based on characteristics of the one or more property records; and for each property record group, determining an average ratio difference between a living area estimated using aerial imagery and a living area included in the property data for each property record in the respective property record group.

13. The computer-implemented method of claim 11, further comprising:

training a machine learning model using training data to form the trained machine learning model, wherein the training data comprises, for one or more second data sources, how recent the respective second data source was updated, whether the respective second data source provides property data values that match property data values provided by other second data sources, a value representing how similar properties for which property data is provided by the respective second data source are to properties in surrounding neighborhoods, or a value representing the similarity of property types and styles of properties for which property data is provided by the respective second data source, and wherein each item in the training data is labeled with data indicating an accuracy of the respective second data source; and applying, as an input to the trained machine learning model, at least one of how recent the first data source was updated, whether the first data source provides property data values that match property data values provided by other data sources in the one or more data sources, a value representing how similar properties for which property data is provided by the first data source are to properties in surrounding neighborhoods, or a value representing the similarity of property types and styles of properties for which property data is provided by the first data source to determine an accuracy of the first data source.

14. The computer-implemented method of claim 11, further comprising:

predicting a data value for one type of property data originating from the first data source using a second trained machine learning model; and modifying the property data to include the predicted data value.

15. The computer-implemented method of claim 11, wherein each of the one or more aerial images is annotated to include a polygon defined by a set of geographic coordinates that fall within a location at which the respective aerial image is captured.

16. The computer-implemented method of claim 15, wherein a first aerial image in the one or more aerial images is annotated to include a first polygon that partially overlaps at least two structures including the structure.

17. The computer-implemented method of claim 16, further comprising:

training a second machine learning model to predict to which structure a polygon is intended to surround;

applying the first aerial image annotated with the first polygon as an input to the trained second machine learning model; and determining that the first polygon is intended to surround the structure based on an output of the trained second machine learning model.

18. A non-transitory, computer-readable medium comprising computer-executable instructions for estimating a living area of a structure, wherein the computer-executable instructions, when executed by a computer system, cause the computer system to:

determine an accuracy of property data originating from one or more data sources using a trained machine learning model;

obtain the property data from a first data source in the one or more data sources having a highest determined accuracy;

obtain a request for the living area of the structure;

process one or more aerial images corresponding to the structure;

estimate a first living area of the structure based on the processing of the one or more aerial images;

determine a property group to which the structure belongs based on the obtained property data;

modify the first living area of the structure by a ratio difference corresponding to the property group to which the structure belongs;

determine a confidence score of the modified first living area;

determine that the confidence score of the modified first living area is less than a threshold score;

determine an adjustment metric for the structure based on a portion of the property data corresponding to the structure;

adjust the modified first living area using the adjustment metric to form a second living area;

determine a second confidence score of the second living area; and transmit, to a user device, either the modified first living area or the second living area based on the confidence score and the second confidence score.

19. The non-transitory, computer-readable medium of claim 18, wherein each of the one or more aerial images is annotated to include a polygon defined by a set of geographic coordinates that fall within a location at which the respective aerial image is captured, and wherein a first aerial image in the one or more aerial images is annotated to include a first polygon that partially overlaps at least two structures including the structure.

20. The non-transitory, computer-readable medium of claim 19, wherein the computer-executable instructions, when executed, further cause the computer system to:

train a second machine learning model to predict to which structure a polygon is intended to surround;

apply the first aerial image annotated with the first polygon as an input to the trained second machine learning model; and determine that the first polygon is intended to surround the structure based on an output of the trained second machine learning model.

* * * * *